United States Patent
Brunsing et al.

[15] 3,658,301
[45] Apr. 25, 1972

[54] APPARATUS FOR PREPARING A DRY POWDER POTATO MIX

[72] Inventors: Rex L. Brunsing; Jon P. Brunsing, both of 345 Golden Gate Avenue, Belvedere, Calif. 94920

[22] Filed: Sept. 15, 1969

[21] Appl. No.: 857,780

[52] U.S. Cl. ................................259/4, 99/104, 99/234
[51] Int. Cl. ........................................................B01f 15/02
[58] Field of Search..................259/4, 60, 18, 48, 36, 11, 259/9, 10, 8, 5, 6, 7; 99/234, 348; 107/14

[56] References Cited

UNITED STATES PATENTS

| | | | |
|---|---|---|---|
| 2,671,647 | 3/1954 | Wolpert.................................259/36 |
| 3,288,442 | 11/1966 | Keil.......................................259/8 |
| 3,511,480 | 5/1970 | Visman..................................259/60 |

Primary Examiner—Robert W. Jenkins
Attorney—Hume, Clement, Hume & Lee

[57] ABSTRACT

There is disclosed a method and an apparatus for carrying out the method for preparing a firm dough-like substance from dry powdered potato mix comprising the steps of: placing a premeasured amount of dehydrated potato mix in a chamber, placing a predetermined amount of water in a second chamber, releasing the predetermined amount of liquid into a receptacle so as to form a thin film flow path of proper thickness along the sides of the receptacle, substantially simultaneously with releasing the liquid, releasing the powdered food mix so as to cause the particles of potato mix to drop into and mix with the liquid stream without any agitation allowing the liquid to flow for a slightly longer period of time than the powdered food mix so as to act as a cleansing means for the receptacle, and collecting the mixture of powder and liquid, allowing the mixture to solidify to the proper consistency thereby forming a firm dough-like substance that is ready for further processing.

17 Claims, 5 Drawing Figures

PATENTED APR 25 1972

INVENTORS.
REX L. BRUNSING
JON P. BRUNSING
BY Hume, Clement, Hume & Lee
Attorneys.

INVENTORS.
REX L. BRUNSING
JON P. BRUNSING
BY Hume, Clement, Hume & Lee
Attorneys.

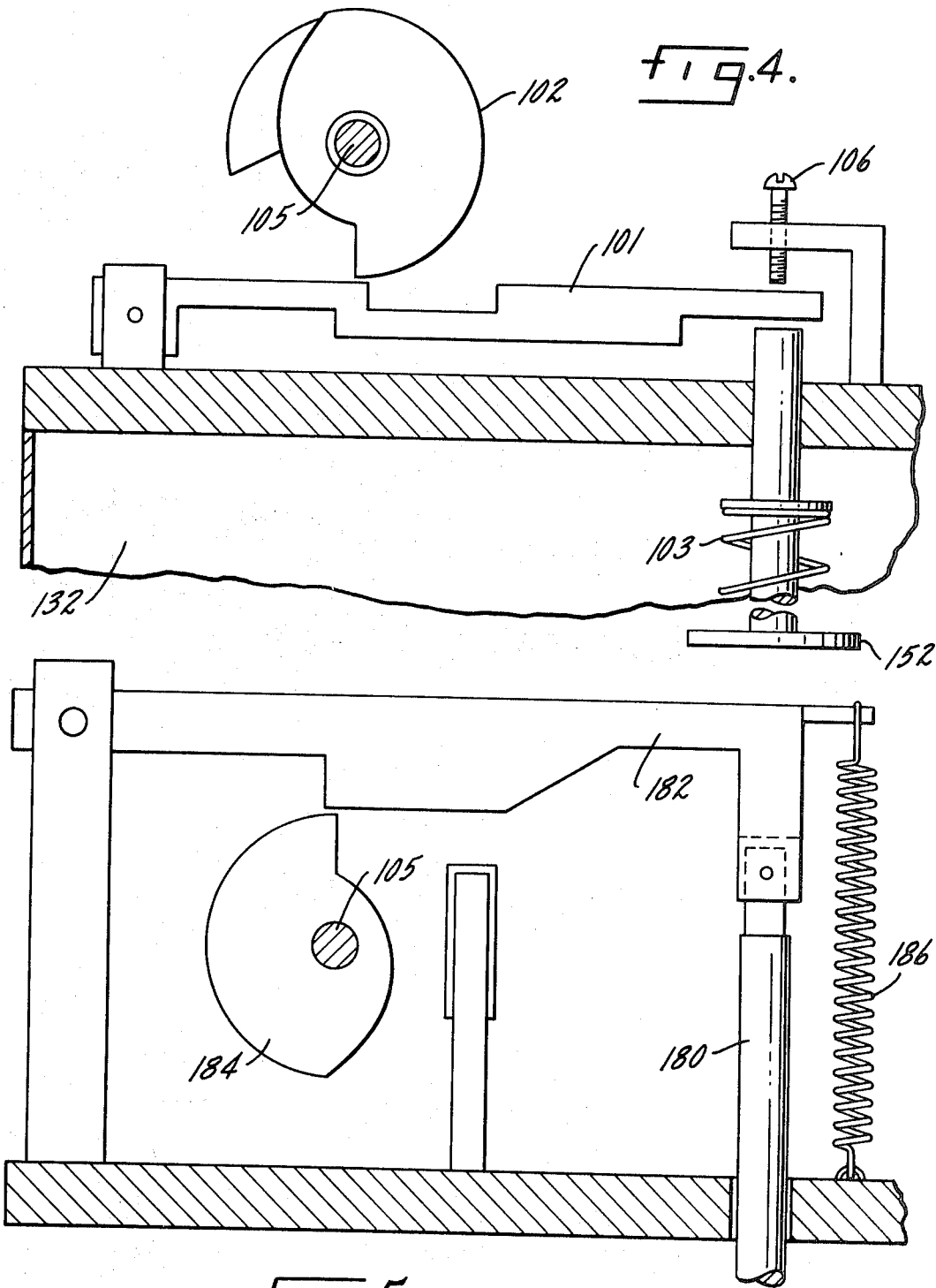

APPARATUS FOR PREPARING A DRY POWDER POTATO MIX

BACKGROUND OF THE INVENTION

The present invention relates to improvement in processing of dehydrated potatoes and the like and more particularly to a new and improved method and apparatus for preparing dehydrated potatoes wherein the dry mix or powder is combined with water or any other liquid in predetermined proportions to form a firm dough-like substance which is of a proper consistency.

In the preparation of dehydrated foods and in particular in the preparation of potatoes from a powdered potato mix, it has been the general practice to employ either mechanical agitating or hand mixing devices to mix the dehydrated powdered potato mix with water to form a dough-like substance. While such devices have served the purpose, they have not proved entirely satisfactory under all conditions of service for the reason that considerable difficulty has been experienced in preventing the liquefied mixture from completely solidifying and becoming unprocessable.

During the past decade there have been many improvements made in the method of preparing and handling food products such as in the dehydration of potatoes into flakes, powder and buds, which when reconstituted in liquid, result in a recognizable product such as mashed, hash brown, or other forms of potatoes. Currently, some major processors of potatoes have developed a potato mix which when reconstituted, forms a solid dough-like substance. The dough may then be extruded or otherwise formed into a shape commonly referred to as French fries or shoe-string potatoes. One such dry powder mix is manufactured by the American Potato Company of Blackfoot, Iowa. The powder mix comprises cooked dried potatoes, vegetable gum, salt, dextrose, vegetable emulsifiers with sodium phosphate, sodium bi-sulphite and a preservative. Another powder mix is manufactured by the J. R. Simplot Company of Caldwell, Idaho. This latter powder mix comprises anhydrated Idaho potatoes, flour, calcium loctate, salt, methyl cellulose, dextrose, vegetable emulsifier, sodium phosphate, sodium bi-sulphite and a preservative.

This utilization of a dehydrated potato mix which when reconstituted in liquid forms a firm dough-like substance eliminates the storing of fresh potatoes that has been previously required in order to make French fries, shoe-strings and the like. Due to the chemical nature of the powdered mix when mixed with water, the liquefied mixture sets extremely firmly in a matter of seconds thereby preventing agitation of the mixture and extrusion of the mixture into either French fries or shoe-string shaped potatoes. In order to overcome this defect, chilled water has generally been used to prolong the mixing cycle. The machines produced to do this mechanically agitate the powdered mix and the chilled water. Although these machines have served the purpose, they have not proved entirely satisfactory under all conditions of service since the time element involved before hardening is still too short and furthermore, while the mix is in a liquid state, it is extremely viscous and sticky, and adheres to most surfaces of the machine. Thus, cleaning of the machine and servicing of the machine due to the inherent properties of the liquified mix have become extremely complicated.

SUMMARY OF THE INVENTION

The general purpose of this invention is to provide a method of manufacturing a dough-like substance from dehydrated potato mixes and an apparatus for carrying out this method which embraces all the advantages of similarly employed dehydration food processing machines and possess none of the aforedescribed disadvantages. To attain this, the present invention contemplates the mixing of the liquid and powdered food mix in predetermined proportions such that the powdered mix is sprinkled into a thin stream of flowing liquid of the proper thickness and this flowing liquid continues to run for a short period after the powdered food mix has been exhausted thereby acting as a cleansing agent and preventing early solidification.

It is, therefore, an object of the present invention to provide a method of mixing a powder and a liquid rapidly without leaving excessive residue in the mixing chamber and without requiring the use of chilled water to prevent setting.

Another object is to provide an apparatus for mixing dehydrated powdered mix and liquid forming a dough-like substance which allows for a relatively continuous mixing cycle and which is low in cost to manufacture.

A further object of the present invention is to provide a method of an apparatus for preparing French fried potatoes and the like from a dry powdered mix.

Still another object is to provide a method and apparatus for preparing dehydrated powdered materials utilizing tap water as a solvent.

BRIEF DESCRIPTION OF THE DRAWINGS

FIG. 4 is an enlarged side view in section of the valve 152 control circuit shown in FIG. 3;

FIG. 5 is an enlarged side view in section of the valve 170 control circuit shown in FIG. 3.

DESCRIPTION OF THE PREFERRED EMBODIMENTS

Figure 1:
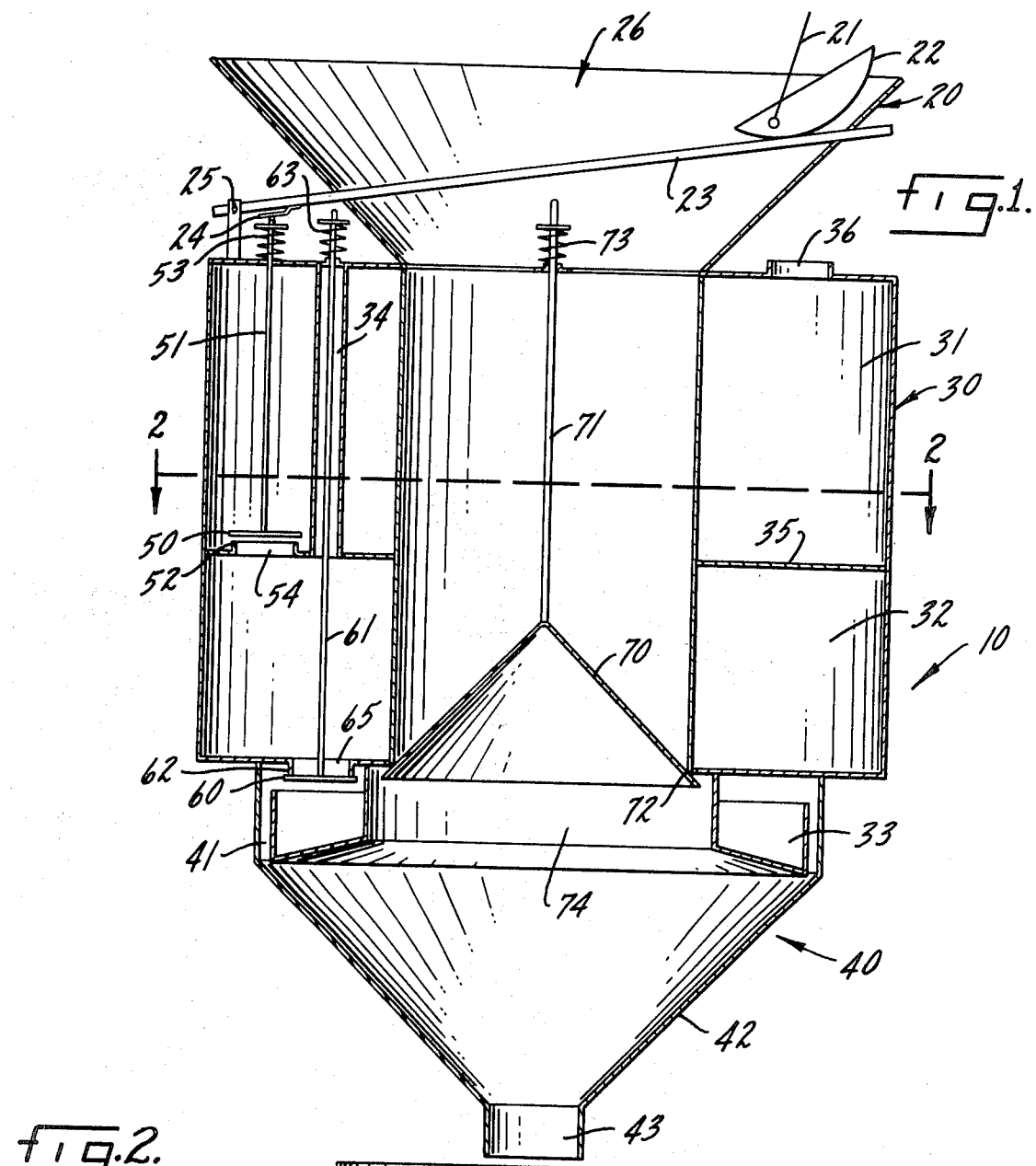
FIG. 1 is a diagrammatic view, partly in section of a first embodiment of the invention.

Referring now to the drawings, FIGS. 1 and 5 illustrate two apparatuses for carrying out the steps of the method set forth below. Broadly, the method comprises placing a premeasured amount of dry powdered food mix in a chamber and placing a premeasured amount of water in a second chamber which is separated from the first chamber. Second, releasing the liquid in a continual flow into a receptacle so as to form a thin film of liquid having a thickness sufficient to absorb the powdered potato mix along the sides of the receptacle and substantially simultaneously releasing the powdered mix so as to allow the powder to fall upon the thin film of water, mixing together by the action of gravity and being conveyed downwardly into a collecting or forming container. Thirdly, allowing the remaining liquid to flow after the powder mix has been exhausted so as to act as a cleansing means for the receptacle. Finally, collecting the liquid mixture and allowing it to solidify forming a firm dough-like substance, which can then be extruded into the shape of a French fried or shoe-string potato.

This method of preparing dehydrated foods will be more clearly understood when taken in conjunction with two apparatuses for carrying out the method as shown in FIGS. 1 through 5.

Referring now to the drawings wherein like reference characters designate like or corresponding parts throughout the several views, there is shown in FIG. 1 an apparatus 10 for mixing a predetermined amount of dry powdered potato mix with a predetermined amount of liquid so as to form a liquid mixture which can solidify into a firm dough-like substance. The apparatus comprises a funnel-shaped mixing chamber 20 encircled by a toroidally shaped water storage chamber 30 having two sections, 31 and 32. Water is introduced into the tank through aperture 36. A predetermined amount of water from water storage chamber section 31 is released into chamber section 32 and then into an intermediate receptacle 33 as will be described below. The overflow from intermediate receptacle 33 flows into a channel 41 of a funnel-shaped mixing receptacle 40. Dry mix chamber 20 contains a dry mix potato powder having a standard composition, referred to above, and which is commercially obtainable from numerous manufacturers. This powder is allowed to fall into the liquid stream through valve opening 74. The liquid mixture of the powder and water then flows into a forming receptacle 44 and solidifies forming a firm dough-like substance which is ready for further processing into any desired shape. The consistency of the dough is such as to allow it to be extruded in the shape of what is commonly known as French fried or shoe-string potatoes.

Figure 2:
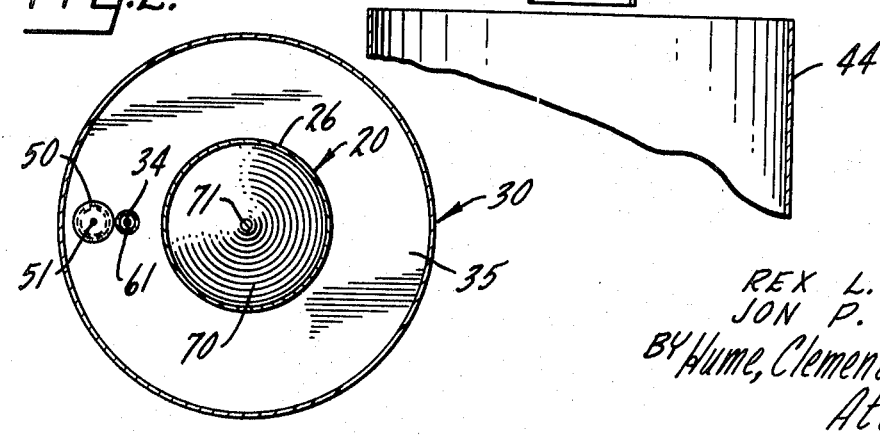
FIG. 2 is a diagrammatic view of a section of the apparatus taken on the lines 2—2 of FIG. 1.

Referring now to the apparatus in more detail, it can be seen that funnel-shaped dry mix chamber 20 is inserted directly into mixing chamber 40. The opening 74 between dry mix chamber 20 and the mixing receptacle 40 is controlled by a normally closed valve 70 having a valve stem 71, a valve seat 72, and a biasing means 73. Valve seat 72 is the inner wall of toroidally shaped water storage tank 30 which encircles dry mix chamber 20 as shown in FIG. 2. Water storage chamber 30 comprises two sections, 31 and 32, separated horizontally by a partition 35. An aperture 54 in the partition is provided, this aperture being selectively controlled by a normally open valve 50 having valve stem 51, valve seat 52, and biasing means 53. Liquid is introduced into water storage chamber 30 through aperture 36. Since valve 50 is normally open, the liquid continues to flow through the first section 31 of water storage chamber 30 into the second section 32 of water storage chamber 30, thus filling this section. Section 32 is vented to atmospheric pressure by air vent 34. At the lower end of section 32 is an aperture 65 that is controlled by normally closed valve 60 having valve stem 61, valve seat 62, and biasing means 63. Valves 50, 60 and 70 are all sequentially operated. This sequential operation is controlled by lever 23 pivotally connected at point 25 to water storage tank 30, which in turn is controlled by cam member 22 and control member 21. Spring 24 maintains lever 23 in an "up" or "off" position thereby allowing the valves 50, 60, and 70 to remain in their normally biased states.

The cylindrical construction of the apparatus is readily appreciated by referring to FIG. 2. Dry mix chamber 20 having a hollow funnel-shaped center section 26 is completely encircled by water storage tank 30. Valves 50, 60, and 70 as well as air vent 34 are shown as passing vertically through the apparatus.

The operation of the apparatus will now be described. A predetermined amount of dry powder potato mix is placed in dry mix chamber 20 through aperture 26. The mix comes to rest on normally closed valve seat 72. A liquid solvent, such as water, is placed into water storage chamber 30 through aperture 36. Since valve 50 is normally open, the water continues to flow through opening 54, filling section 32 of water storage chamber 30. The size of section 32 is determined by the ratio of liquid to powder mix that is ultimately required. For example, if two parts of water were required for every one part of powder the capacity of section 32 would be twice the volume of the powder inserted into dry mix chamber 20, i.e., if 30 measured ounces of powder were to be inserted, then the capacity of section 32 would have to be 60 liquid ounces. This proportioning of the water storage section 32 ensures that the proper amount of liquid is always utilized to make the mixture.

When lever arm 21 is pulled downwardly, cam 22 forces lever 23 downwardly, closing valve 50 by forcing valve stem 51 against valve seat 52 while opening valve 60 by pushing valve stem 61 away from valve seat 62. This action seals opening 54 preventing further liquid from entering into fixed volume section 32 and allows the liquid previously in section 32 to flow out through aperture 65 into intermediate receptacle 33, since section 32 of water storage chamber 30 is vented to atmospheric pressure through vent 34. At a slight instant of time later, valve 70 is opened in sequence by pushing valve stem 71 away from valve seat 72, allowing the powder mix to fall freely through opening 74. When water conveying chamber 33 is filled, the water will flow out through aperture 41 at the top of the chamber thereby causing a thin film flow along the walls 42 of mixing receptacle 40. The water in mixing receptacle 40 flows in a thin film over the wall 42 and downwardly towards drain spout 43. The slightly delayed opening of valve 70 causes the dry powder mix, which has been placed into dry mix chamber 20, to fall onto the thin film of flowing water at a predetermined point where it is carried by the flowing water downwardly to drain spout 43. The thickness of the thin film flow is arranged so as to provide a proper amount of solvent for the powdered potato mix. Due to the gravitational effect on the powder, the particles intermix with the liquid thin film during the downward flow of the mixture forming a firm dough-like substance of the proper consistency. The water releasing valve 60 and the dry mix releasing valve 70 are located at a predetermined distance from the point of the joining of the mixture and the liquid so that the water precedes the dry mix at said point. This is controlled by the length of the stems 61 and 71 so that valve 60 is opened slightly before valve 70. The amount of water in fixed volume water section 32 is such as to allow the water to continue to flow for a short time after dry mix chamber 20 has been emptied and the dry mix has stopped flowing. This acts as a cleansing means for maintaining mixing receptacle 40 free of hardened mixture.

As the dry potato mix falls upon the flowing sheet of water it is conveyed downwardly by gravity and the powdered potato mix immediately starts absorbing the moisture and stays in a fluid state, as it rapidly flows down through the drain spout 43. This liquid texture and rapid flow prevents the mixture from solidifying without requiring external agitation, until it is in receptacle 44 where it sets up in solid form as a dough-like substance and is then capable of extrusion.

After the cycle is finished, lever 21 is raised, releasing the pressure on cam 22 so that lever 23 is forced upwardly by spring 24. The reverse valve action now takes place as lever 23 is raised. Valve 70 is closed by baising means 73, valve 60 is closed by biasing means 63, and valve 50 is opened by spring 53. This allows the water to again flow from the first section 31 of water storage chamber 30 into fixed volume section 32 again filling up section 32. A new can of dry potato mix is placed into dry mix chamber 20 and the apparatus is again ready to mix another "batch" of dough.

It is to be noted that the time interval from the time the dry potato mix joins the film of water until the mixture enters forming receptacle 44 is very short. This short mixing cycle is possible because of the proportioning of the dry mix and water as well as the rapid flow of the liquid mixture. The predetermined proportions of mix and water are maintained so that the dry mix is virtually sprinkled over the water and so that an adequate but not excessive supply of water is available for complete absorption of the powder or, conversely, so that the dry powder mix is thoroughly distributed. For a typical potato dry mix, the proportions utilized are approximately two parts of water for one part of powder mix. These proportions are determined based on the type of dry mix utilized and can be found on the instruction label of any powdered food mix. Since all mixes require more water than mix, the flow of the water and mixture can be arranged such as to allow the liquid to precede the flowing of the mix and to also supersede the flow of the powder mixture thereby acting as a cleansing agent. By utilizing a thin film flow of water and the gravitational effect of the powder dropping into the thin film flow, external agitation of the dough substance is no longer required. Further, since the time cycle is extremely short, it is no longer necessary to utilize cold water as the liquid agent and tap water may, therefore, be utilized since the solidification of the mixture is no longer dependent upon temperature at this point but is maintained in a liquid state by the rapid flow of the liquid.

Figure 3:
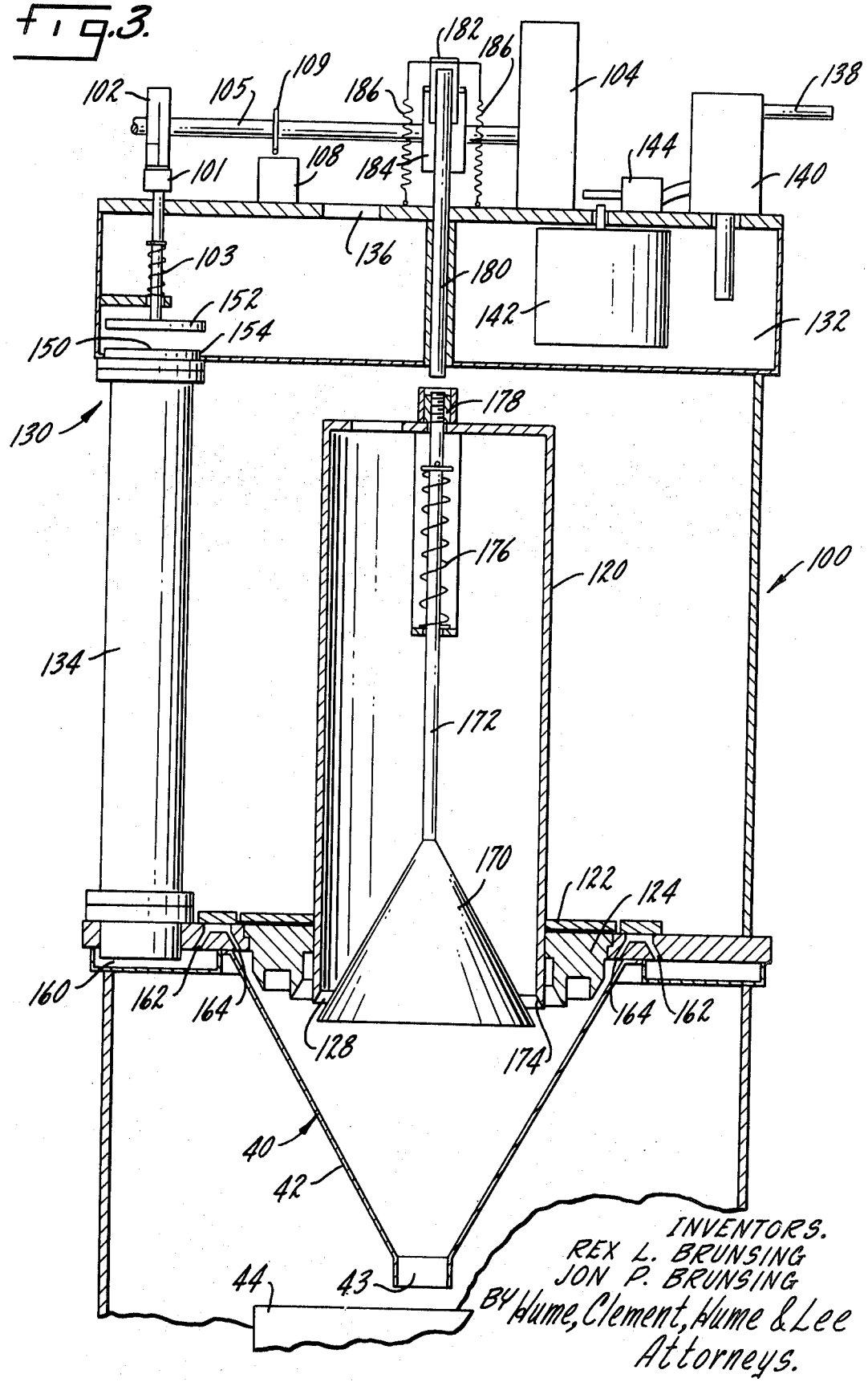
FIG. 3 is a diagrammatic view, partly in section of a second preferred embodiment of the invention.

Referring now to FIG. 3, there is shown a preferred alternative embodiment of an apparatus 100 for preparing potatoes from a powdered potato mix. Apparatus 100 comprises a first chamber 120 which is adapted to hold the dry powdered potato mix. A second chamber 130 is located adjacent to the first chamber 120 and is adapted to hold the liquid solvent. Liquid chamber 130 is divided into two sections, 132 and 134. Liquid may be introduced into the first section 132 through an aperture 136 or it may be introduced automatically by connecting a source of liquid to a fitting 138 of a solenoid valve 140. Solenoid valve 140 is attached to liquid chamber 130 and is operated by float 142 and switch 144.

The liquid introduced into liquid chamber 130 flows from the first section 132 through a valve controlled aperture 150 into the second section 134. The liquid in section 134 of the liquid chamber 130 then flows into an intermediate receptacle 160. Connected to the other end of intermediate receptacle 160 is a port 162. It will be noted that the base of section 134 is lower than port 162 and, therefore, liquid will flow through port 162 only when additional liquid is being introduced into the second section 134 of liquid chamber 130. When valve 152 associated with the inlet aperture 150 is closed, liquid will remain in section 134 and will not pass through port 162.

The outlet 164 of port 162 empties into a first receptacle 40 which is identical to the receptacle shown in FIG. 1. The outlet of first chamber 120 also empties into receptacle 40. When liquid is flowing from chamber 132 into section 134 and through port 162, a thin film of water flows down the sides 42 of receptacle 40. As will be explained in more detail below, powder from chamber 120 is released into receptacle 40 and onto the thin film flow of liquid. Due to the gravitational effect on the powder, the particles intermix with the liquid thin film during the downward flow of the mixture forming a firm dough-like substance of the proper consistency. The firm dough-like substance is formed in a second receptacle 44 which receives the liquid flow from the output spout 43 of first receptacle 40.

The operation of apparatus 100 will now be explained in more detail with reference given to FIGS. 3 through 5. Beginning with the liquid system, the liquid chamber 130 may be filled manually through aperture 136, or may be filled automatically by having a source of liquid connected to fitting 138 of solenoid valve 140 which valve is operated by float 142 and switch 144. The liquid contained in the first section 132 of chamber 130, when the apparatus 100 is in operation, flows past valve 152 and valve seat 154 through aperture 150 into the second section 134 of liquid chamber 130 and then flows into intermediate receptacle 160. The liquid then flows through ports 162 and outlets 164 onto the sides 42 of receptacle 40 thereby creating a thin film of liquid along the sides 42.

FIG. 4 shows a side view of the cam control for valve 152. Referring to FIGS. 3 and 4, valve 152 in a preferred embodiment may be controlled by a cam follower 101 and a cam 102, and when in operating position as shown in FIG. 3, the valve 152 is held up by a spring 103. Cam 102 is attached to a cam shaft 105 which is actuated by a motor 104. In a preferred embodiment, cam 102 is an adjustable liquid cam. The rate of flow of liquid through aperture 150 may be varied by adjusting set screw 106 associated with valve 152. The time period that the valve 152 is opened and closed is controlled by cam 102.

At the end of the liquid cycle, valve 152 is seated on valve seat 154, and section 134 of liquid chamber 130 remains filled with liquid. As explained above, the base of section 134 is lower than the top of port 162 and, therefore, when the source of water pressure is eliminated by the closing of valve 152, no liquid may pass through port 162. In the preferred embodiment, the area of liquid chamber 130 may be arranged such that there is only a slight drop of liquid level during the entire liquid cycle and due to this, it is possible to start the flow of liquid and to stop the same practically instantly with a minimum of head pressure variation. When valve 152 is again raised from valve seat 154, new liquid from the first section 132 of chamber 130 is introduced through aperture 150. This raises the pressure in the second section 134, thus casing liquid to flow through port 162 and outlet 164 into receptacle 40.

Dry mix chamber 120 has been constructed in this embodiment to be removable from the apparatus 100. Flange 122, attached to chamber 120, rests on a removable ring plate 124. Chamber 120 is filled through a port 136 manually when the chamber 120 is removed from the apparatus 100. By merely tapping or shaking the chamber 120, the mix will substantially level off. After chamber 120 has been filled with a predetermined amount of dry powdered potato mix, it is placed back into apparatus 100. An operator then closes a switch thereby closing an electrical circuit and overriding a limit switch 108 which is controlled by lever arm 109. Lever arm 109 is attached to cam shaft 105.

Dry mix chamber 120 has an outlet 128 which leads into first receptacle 40. Outlet 128 is controlled by a valve 170 comprising a valve stem 172 and a valve seat 174. Associated with valve stem 172 is a spring 176 which holds the valve normally closed. An adjusting nut 178 may be employed to adjust the stroke of valve stem 172. Valve 170 is actuated by a plunger rod 180 which is attached to a cam follower 182. Cam follower 182 is controlled by cam 184. Cam 184 releases cam follower 182, which is held down under pressure by means of a pair of springs 186. During operation, plunger rod 180, attached to cam follower 182, is instantly forced downwardly driving stem 172 downward under pressure causing valve 170 to open, thereby allowing the dry powdered mix to freely flow between valve 170 and valve seat 174 through aperture 128. The powder drops onto the thin film of flowing liquid in first receptacle means 40. When the mix has been emptied from chamber 120, mix cam 184 engages cam follower 182, thus closing valve 170. The operation of the cam 184 may be seen in FIG. 5.

Thus, when apparatus 100 is placed in its operational state, liquid flows from the first section 132 of the liquid chamber means 130 through the second section 134, through intermediate receptacle 160, and out through outlets 164 of ports 162. This causes a thin film liquid flow along the sides 42 of receptacle 40. The liquid then flows through outlet spout 43 and into a second receptacle 44 which is used for forming the dough-like substance. Approximately at the time that the liquid begins flowing, normally closed valve 170 is opened, allowing the dry powdered mix to fall onto the thin film of flowing water where it is carried by the flowing water downwardly to drain spout 43. The thickness of the thin film flow is arranged so as to provide a proper amount of solvent for the powdered potato mix. Due to the gravitational effect on the powder, the particles intermix with the liquid thin film during the downward flow of the mixture forming a firm, dough-like substance of the proper consistency in second receptacle means 44. The water continues to flow for a short period of time after the mix has been exhausted, thereby acting as a cleansing agent.

As explained above with regard to mixing apparatus 10 shown in FIG. 1, it can be seen that as the dry potato mix falls upon the thin film flowing sheet of water, it is conveyed downwardly by gravity and the powdered potato mix immediately starts absorbing the mixture and stays in a fluid state as it rapidly flows down through the drain spout 43. This liquid texture and rapid flow prevents the mixture from solidifying without requiring external agitation or shaking, until it is in the second receptacle 44 where it sets up in solid form as a dough-like substance and is then capable of extrusion.

It can be seen that apparatus 10 and apparatus 100 operate on the same principle but differ structurally. It will also be noted, that with regard to apparatus 10, at the end of a cycle all liquid solvent has been discharged from the second section 32 of liquid storage means 30. However, in the embodiment shown in FIGS. 3 through 5, liquid solvent always remains in the second section 134 of the liquid storage means 130.

It should be understood, of course, that the foregoing disclosure relates only to preferred embodiments of the invention and that the method disclosed can be performed by any suitable apparatus and that the apparatuses disclosed are only two means of performing this method. Obviously, numerous modifications or alterations may be made therein, without departing from the spirit and the scope of the invention as set forth in the appended claims.

What is claimed is:

1. An apparatus for preparing a firm dough-like substance from a dry powdered potato mix comprising:

a first chamber means for storing a powder-like substance having an inlet means and an outlet means;

a liquid storage means having a first inlet means and a first outlet means;

a first receptacle means having an inlet means and an outlet means, said first receptacle inlet means being oriented to receive said powder-like substance from said first chamber outlet means and to receive said liquid from said liquid storage outlet means;

a second receptacle having an inlet means oriented to receive said first receptacle outlet means; and a control means for regulating the output flow of said powder-like substance from said first chamber means and causing a thin film liquid flow from said liquid storage means thereby providing a proper mixture of liquid from said liquid storage means and powder from said first chamber means wherein mixing of said powder and said liquid occurs, said mixing being caused by a gravitational effect thereby forming a liquid mixture and wherein said liquid mixture flows to said second receptacle means wherein said dough-like substance is formed by a solidification of said liquid mixture.

2. The apparatus of claim 1 wherein said liquid flow from said liquid storage output means flows in a thin film along the sides of said first receptacle means.

3. The apparatus of claim 2 wherein first chamber output means is oriented so as to deposit said powder-like substance stored therein onto said thin film liquid flow along said sides of said first receptacle.

4. The apparatus of claim 3 wherein said liquid storage means comprises a first section and a second section, said first section and said second section being separated by a partition means having an aperture therein; and wherein the liquid flow from said first section into said second section through said aperture is controlled by said control means.

5. The apparatus of claim 4 wherein said control means comprises:

a first normally open closure means for said aperture in said liquid storage means to allow liquid to normally flow from said first section to said second section of said liquid storage means; and a second normally closed closure means between said first chamber output means and said first receptacle input means.

6. The apparatus of claim 5 wherein said control means further comprises a third normally closed closure means between said liquid storage output means and said first receptacle input means.

7. The apparatus of claim 6 wherein said first closure means, said second closure means, and said third closure means operate to prevent further liquid from entering into said second section of said liquid storage means, to release said from said liquid storage means onto said walls of said first receptacle means, and further operate to release said powder-like substance in said first chamber means onto said liquid flow and wherein said liquid flow continues for a short period of time after said powder flow has been exhausted.

8. The apparatus of claim 7 wherein said amount of liquid flowing into said first receptacle means is limited to the volume of liquid in said second section of said liquid storage means.

9. The apparatus of claim 8 further comprising:

an intermediate trough-like receptacle means within said first receptacle means and adjacent to said liquid storage output means wherein said liquid flow from said liquid storage means flows into said intermediate receptacle and wherein an overflow occurs causing said liquid to flow along the sides of said first receptacle means.

10. The apparatus of claim 9 wherein said second section of said liquid storage means further comprises a venting means subjecting said second section to atmospheric pressure.

11. The apparatus of claim 9 wherein the volume of said second section of said liquid storage means is proportional to the volume of said powder-like substance in said first chamber means and wherein said proportion of said volumes is predetermined.

12. The apparatus of claim 4 wherein said second section of said liquid storage means further comprises a venting means subjecting said second section to atmospheric pressure.

13. The apparatus of claim 5 further comprising:

an intermediate trough-like receptacle means within said first receptacle means and adjacent to said liquid storage output means wherein said liquid flow from said liquid storage means flows into said intermediate receptacle and wherein an overflow occurs causing said liquid to flow along the sides of said first receptacle means.

14. The apparatus of claim 5 further comprising an intermediate receptacle means having an inlet and an outlet, said inlet being oriented to receive said liquid from said second section of said liquid storage means and said outlet of said intermediate receptacle being oriented to discharge said liquid flow onto said sides of said first receptacle means, thereby causing said thin film liquid flow.

15. The apparatus of claim 14 wherein said outlet of said intermediate receptacle is oriented such that said liquid flows from said second section of said liquid storage means only when said first closure means is open and wherein said liquid remains in said second section when said first closure means is closed.

16. The apparatus of claim 15 wherein said first closure means and said second closure means operate to cause said liquid to flow from said first section of said liquid storage means to second section of said liquid storage means, to said intermediate receptacle means onto said walls of said first receptacle means, and further operate to release said powder-like substance in said first chamber means onto said liquid flow and wherein said liquid flow continues for a short period of time after said powder flow has been exhausted.

17. An apparatus for preparing a firm dough-like substance from a dry powdered potato mix comprising:

a first chamber means for storing a powder-like substance having an inlet means and an outlet means;

a liquid storage means comprising a first section and a second section, said first and second section being separated by a partition means having an aperture therein;

a first receptacle means having an inlet means and an outlet means, said receptacle means being oriented to receive said powder-like substance from said first chamber outlet means and to receive said liquid from said liquid storage means;

an intermediate trough-like receptacle means located within said first receptacle means and adjacent to said liquid storage output means wherein said liquid flow from said second section of said liquid storage means flows into said intermediate receptacle and wherein an overflow occurs causing said liquid to flow along the sides of said first receptacle means;

a second receptacle having an inlet means oriented to receive said first receptacle outlet means;

a venting means to subject said second section of said liquid storage means to atmospheric pressure;

a first normally open closure means associated with said aperture in said liquid storage means to allow liquid to normally flow from said first section to said second section of said liquid storage means;

a second normally closed closure means between said first chamber output means and said first receptacle input means; and a third normally closed closure means between said liquid storage output means and said first receptacle input means wherein said first closure means, said second closure means, and said third closure means operate to prevent further liquid from entering into said second section of said liquid storage means, operate to release liquid from said liquid storage means onto said walls of said first receptacle means causing a thin film liquid flow, and operate to release said powder-like substance in said first chamber means onto said thin film liquid flow wherein mixing of said powder and said liquid occurs, said mixing being caused by a gravitational effect, thereby forming a liquid mixture and wherein said liquid mixture flows to said second receptacle means wherein said dough-like substance is formed by a solidification of said liquid mixture, and wherein said thin film liquid flow continues for a short period of time after said powder flow has been exhausted.

* * * *

UNITED STATES PATENT OFFICE
CERTIFICATE OF CORRECTION

Patent No. 3,658,301      Dated April 25, 1972

Inventor(s) Rex L. Brunsing; Jon P. Brunsing

It is certified that error appears in the above-identified patent and that said Letters Patent are hereby corrected as shown below:

Column 4, line 31, change "baising" to -- biasing --.

Column 5, line 67, change "casing" to -- causing --.

Column 7, line 56, after the word "said", and before the word "from", insert the word -- liquid --.

Signed and sealed this 5th day of September 1972.

(SEAL)
Attest:

EDWARD M. FLETCHER, JR.             ROBERT GOTTSCHALK
Attesting Officer                  Commissioner of Patents